United States Patent [19]
Yokoyama

[11] Patent Number: 5,870,305
[45] Date of Patent: Feb. 9, 1999

[54] CONTROL METHOD FOR DIE CAST MACHINE

[75] Inventor: Hiroshi Yokoyama, Kanagawa-ken, Japan

[73] Assignee: Toshiba Kikai Kabushiki Kaisha, Japan

[21] Appl. No.: 816,793

[22] Filed: Mar. 19, 1997

[30] Foreign Application Priority Data

Mar. 25, 1996 [JP] Japan ................................. 8-068356

[51] Int. Cl.$^6$ ................................................. G06F 15/00
[52] U.S. Cl. ........................... 364/472.02; 364/475.01; 364/475.02; 364/475.05; 364/475.1; 702/84; 702/149
[58] Field of Search .......................... 364/565, 559–562, 364/472.02, 475.01, 475.02, 475.05, 475.1, 472.07, 476.01; 702/149, 84

[56] References Cited

U.S. PATENT DOCUMENTS

| | | | |
|---|---|---|---|
| 4,563,744 | 1/1986 | Tsuboi | 364/476 |
| 4,881,186 | 11/1989 | Tsuboi et al. | 364/565 |
| 5,207,267 | 5/1993 | Iwamoto et al. | 164/457 |
| 5,455,773 | 10/1995 | Frey | 364/476 |
| 5,493,503 | 2/1996 | Richards et al. | 364/476 |
| 5,513,115 | 4/1996 | Richards et al. | 364/476 |

*Primary Examiner*—John Barlow
*Assistant Examiner*—Hien Vo
*Attorney, Agent, or Firm*—McDonnell, Boehnen Hulbert & Berghoff

[57] ABSTRACT

A control method for die cast machines, which performs multi-step injection speed control depending on a plunger position of an injection cylinder apparatus, the control method comprising the steps of; storing setting values of injection speeds of respective speed steps such as low injection speed and high injection speed and speed change-over plunger positions such as a high speed injection starting position preliminarily in memories; measuring actual values for the injection speed and speed change-over plunger position in actual casting by a speed operation unit and a high speed injection starting position detecting unit; obtaining average values of the actual values in actual castings of a predetermined frequency by an average value operation unit; and correcting control values for the injection speed and the speed change-over plunger position in next casting to be performed.

4 Claims, 3 Drawing Sheets

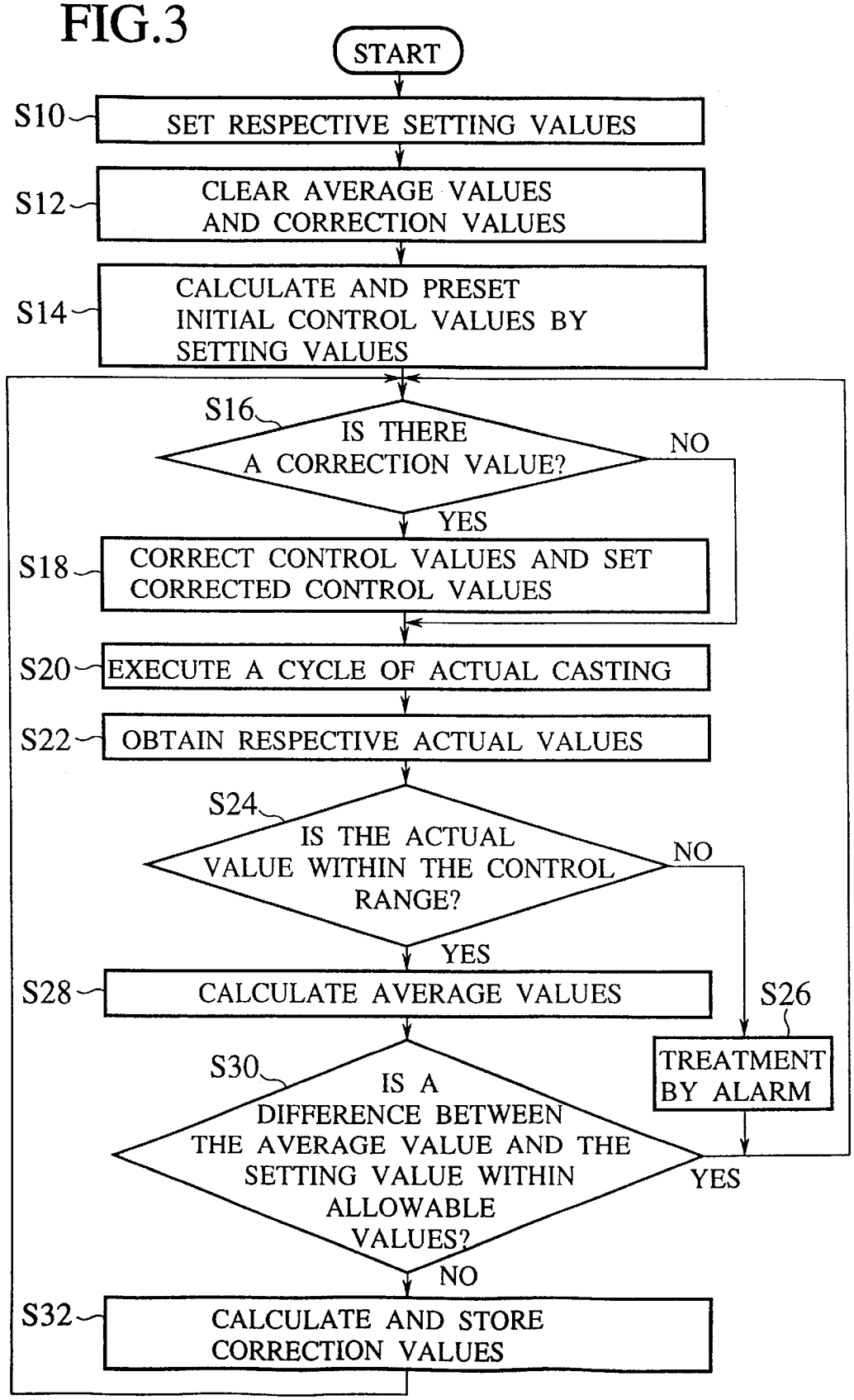

CONTROL METHOD FOR DIE CAST MACHINE

BACKGROUND OF THE INVENTION

1. Field of the Invention

This invention relates to a control method for die cast machines and more particularly to a control method for die cast machines which carry out multi-step injection speed control depending on positions of a plunger of an injection cylinder.

2. Description of the Prior Art

Generally, in die cast machines, hydraulically driven injection cylinders are utilized. An injection plunger of the injection cylinder apparatus is advanced at a low injection speed to start injection of molten metal to mold cavities. If the injection plunger advances up to a predetermined position, the injection plunger is advanced at a high injection speed to achieve high speed injection of molten metal to the mold cavities. The multi-step injection speed control is achieved in this manner. In other cases, the injection plunger is advanced at medium injection speeds between a low speed advancement interval and a high speed advancement interval.

Injection speeds of respective speed steps such as the low injection speed and the high injection speed and speed change-over plunger positions such as the high speed injection starting position have each appropriate value which is determined depending on mold data and casting condition data. The multi-step injection speed control is carried out so as to drive the plunger at this appropriate value.

The injection speeds of the respective speed steps such as the low injection speed and the high injection speed are controlled by means of hydraulic pressure control on the injection cylinder apparatus. Thus, actual injection speeds may be changed due to changes in oil temperature and the speed change-over plunger position may be changed due to a delay in action of a low speed—high speed change-over valve of hydraulic system.

However, because generally the injection speed of the die cast machine is high speed, it is difficult to perform feedback compensating control for the aforementioned multi-step injection speed control. Actually, there have been never seen any die cast machines which perform the multi-step injection speed control in feed-back compensation type.

Thus, conventionally correction of speed change-over plunger positions have been achieved depending on sense of operators. Usually corrections of the injection speeds of respective speed steps have not been performed.

SUMMARY OF THE INVENTION

Accordingly, an object of the present invention is to solve the above-described problem and provide a control method for die cast machines which automatically performs an appropriate multi-step injection speed control based on appropriate values without depending on operators by automatically correcting injection speeds of respective speed steps such as low injection speed and high injection speed and a speed change-over plunger position such as a high speed injection starting position depending on condition of actual castings.

To this aim, there is provided a control method for die cast machines, which performs multi-step injection speed control depending on a plunger position of an injection cylinder apparatus: the control method comprising the steps of; storing setting values of injection speeds of respective speed steps such as low injection speed and high injection speed and speed change-over plunger positions such as a high speed injection starting position preliminarily in memories; measuring actual values for the injection speed and speed change-over plunger position in actual casting by measuring means; obtaining average values of the actual values in actual castings of a predetermined frequency by arithmetic operation means; and correcting control values for the injection speed and the speed change-over plunger position in next casting to be performed so as to eliminate a difference between the setting values and the average values.

According to this invention, average values of actual values of injection speeds and a speed change-over plunger position in actual casting are obtained and the average values are compared with each of setting values. Then, control values for the injection speed and the speed change-over plunger position in next casting are corrected in learning type feed-forward fashion so as to eliminate a difference between each of the average values and each of the setting values.

According to a preferable aspect of the present invention, there is provided a control method for die cast machines wherein whether or not the actual values are within each of predetermined control ranges and if the actual values are not within each of the control ranges, it is determined that an error occurs so that the actual values are not utilized for calculation of the average values.

According to this aspect of the embodiment, if the actual values are not within the control range, those actual values are not used for calculation of the average values and excluded from an objective of sampling for learned control.

According to preferable another aspect of the present invention, there is provided a control method for die cast machines wherein the average values are cleared each time when the setting values are newly set and if a frequency of actual castings does not reach the predetermined frequency just after the setting values are newly set, the average values are obtained according to the actual values of a frequency of actual castings just after the newly setting and further the control values for the injection speed and the speed change-over plunger position for next actual casting are corrected so as to eliminate a difference between the setting values and the average values.

According to this aspect of the embodiment, just after the setting values are newly set, the average values are obtained according to only the actual values provided by a frequency of the actual castings after the newly setting of the setting values. Just after the setting values are newly set, the control values for the injection speed and the speed change-over plunger position for next actual casting are corrected so as to eliminate a difference between each of the setting values and each of the average values. Thus, a maximum sampling number for calculation of the average values is limited to the predetermined frequency, however a minimum sampling number is 1.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a flow chart showing a flow of operations of a die cast machine to which the control method of the present invention is applied.

DESCRIPTION OF THE PREFERRED EMBODIMENTS

Embodiments of the present invention will be described in detail with reference to the accompanying drawings.

Figure 1:
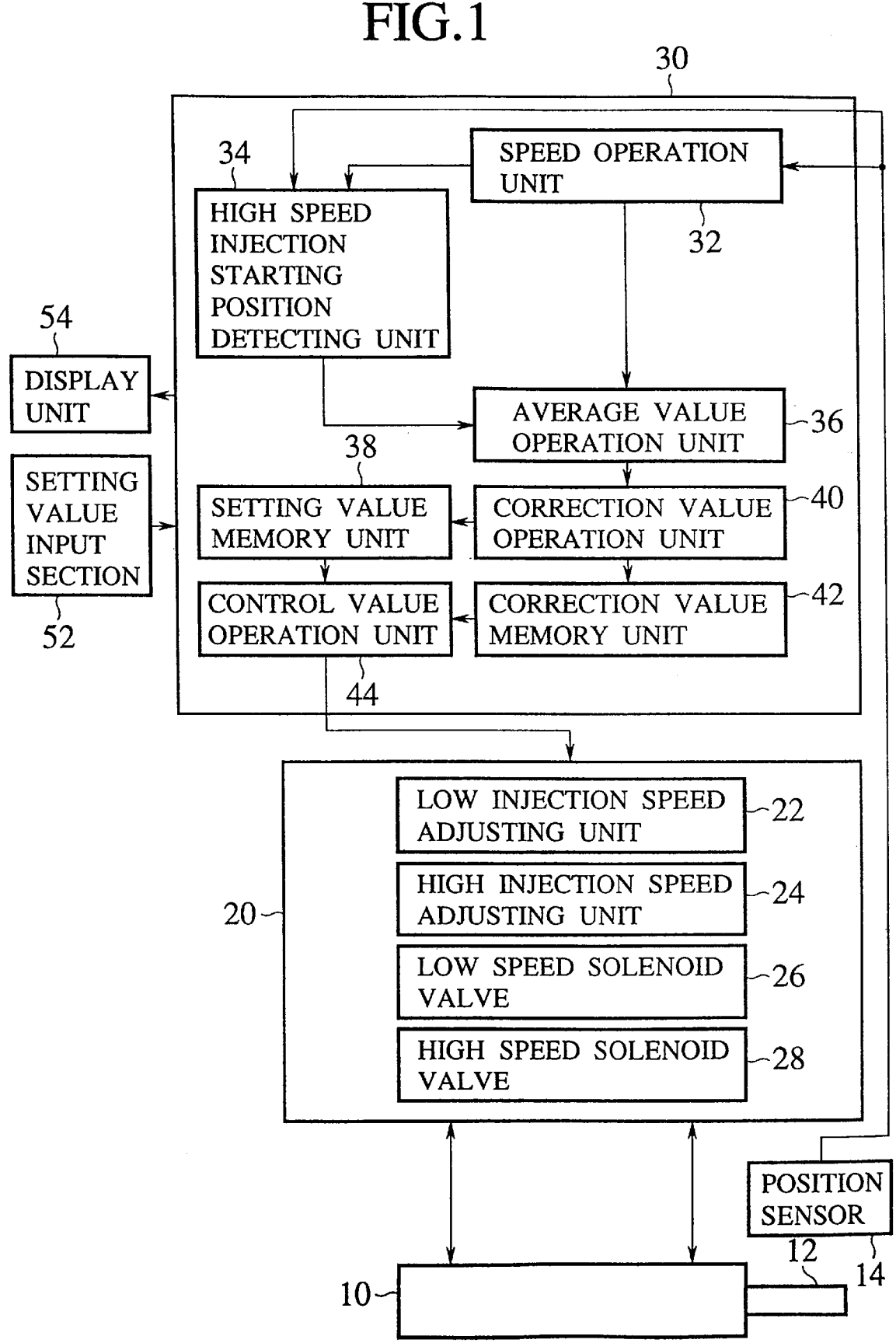
FIG. 1 is a block diagram showing a control apparatus for die cast machines for use in embodiments of a control method for die cast machines according to the present invention.

FIG. 1 shows a die cast machine control apparatus to be used for carrying out embodiments of a control method for die cast machines according to the present invention. Referring to FIG. 1, reference numeral 10 denotes an injection cylinder, numeral 20 denotes a hydraulic circuit apparatus for the injection cylinder apparatus 10 and numeral 30 denotes a control apparatus.

The hydraulic circuit apparatus 20 comprises remote control type low injection speed adjusting unit 22 and high injection speed adjusting unit 24, each of them variably setting a low injection speed and a high injection speed of an injection plunger 12, a low speed solenoid valve 26 and a high speed solenoid valve 28. The hydraulic circuit apparatus 20 advances the injection plunger 12 at a low injection speed adjusted by the low injection speed adjusting unit 22 when only the low speed solenoid valve is excited, and advances the injection plunger 12 at a high injection speed adjusted by the high injection speed adjusting unit 22 when both the low speed solenoid valve 26 and the high speed solenoid valve 28 are excited.

The control unit 30 comprises a speed operation unit 32, a high speed injection starting position detecting unit 34, an average value operation unit 36, a setting value memory unit 38, a correction value operation unit 40, correction value memory unit 42 and a control value operation unit 44.

The speed operation unit 32 calculates a travel speed (actual value) of the injection plunger 12 according to changes in a position of the plunger measured by a position sensor 14.

The high speed injection starting position detecting unit 34 fetches a position data of the plunger when a travel speed of the injection plunger calculated by the speed operation unit 32 is changed from a low speed to a high speed through position sensors 14 to detect an actual high speed injection starting position (actual value).

The average value operation unit 36, through predetermined numbers of actual castings, calculates an average value of high speed injection starting positions detected by the high speed injection starting position detecting unit 34 and respective average values of a low injection speed and a high injection speed calculated by the speed operation unit 32.

These average values are cleared each time when setting values (preset values) such as the low injection speed, the high injection speed and the high speed injection starting position are newly set. If a frequency of actual casting does not reach a predetermined frequency (maximum sampling number) for calculation of the average value after the setting value is newly set, the average values are obtained based on actual values provided by an actual frequency of castings after the new setting value is set. A maximum number of samplings is, at biggest, about 10 and usually set to 3–5.

A control range having a upper limit and a lower limit is set for the respective setting values such as the low injection speed, the high injection speed and the high speed injection starting position. The average value operation unit 36 determines whether or not an actual value is within the setting control range. If the actual value is not within the control range, this is determined as an error and that actual value is excluded without being used for calculation of the average value.

The setting value memory unit 38 memorizes the respective setting values such as the low injection speed, the high injection speed and the high speed injection starting position which are input by the setting value input section 52 such as a keyboard. Entry of the setting values such as the low injection speed, the high injection speed and the high speed injection starting position can be interactively carried out through a setting value input screen displayed on a display unit 54.

The correction value operation unit 40 compares the aforementioned respective setting values stored in the setting value memory unit 38 with the actual average value calculated by the average value operation unit 36 and calculates a correction value for each of the setting values so as to eliminate a difference therebetween. This correction values are stored in the correction value memory unit 42.

The control value operation unit 44 calculates control values for the low injection speed, the high injection speed and the high speed injection starting position for next actual casting according to the respective setting values stored in the setting value memory unit 38 and the respective correction values stored in the correction value memory unit 42 and outputs control instructions to the hydraulic circuit apparatus 20.

Figure 2:
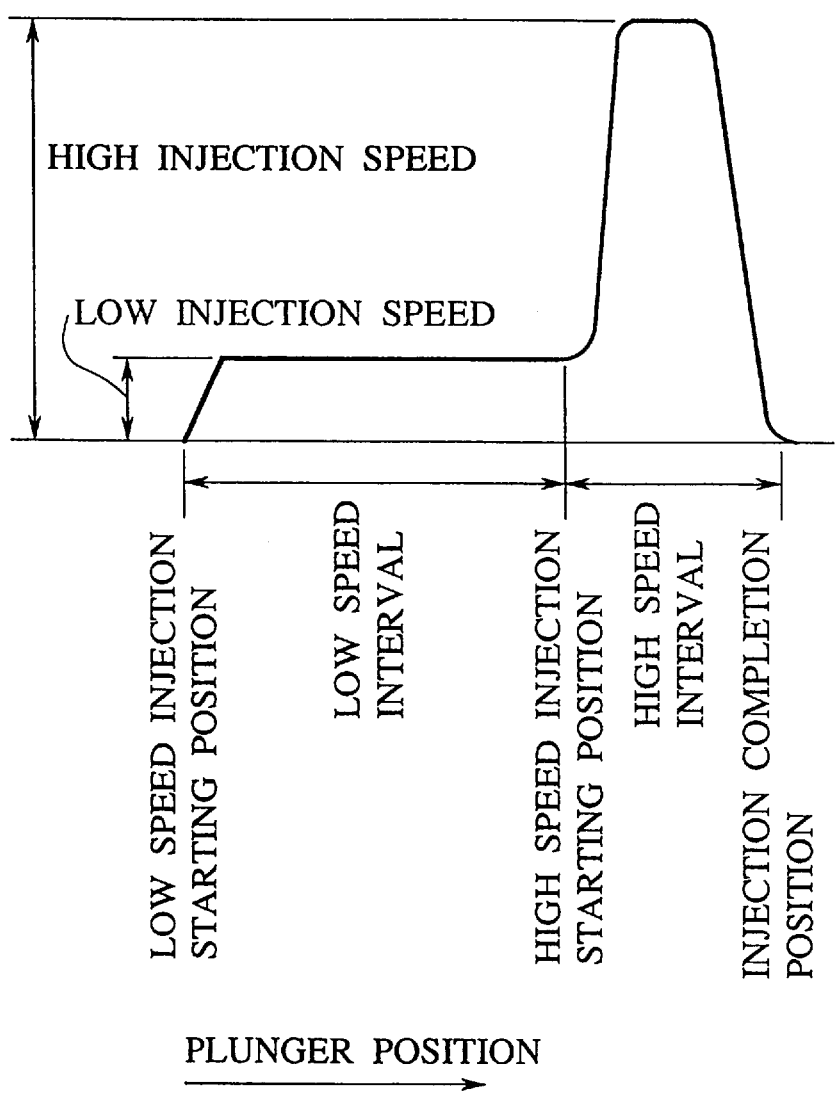
FIG. 2 is a graph showing injection speed characteristics of a die cast machine to which the control method of the present invention is applied.

FIG. 2 shows injection speed characteristics of a die cast machine to which the control method of the present invention is applied. The high speed injection starting position can be obtained by subtracting the high speed interval length from an injection completion position. The injection completion position can be obtained as an initial value depending on a difference between a lost stroke and respective setting values of biscuit thickness.

FIG. 3 shows a flow of operations of a die cast machine to which the control method of the present invention is applied.

First, appropriate values (control target values) for the low injection speed, the high injection speed and the high speed injection starting position are set as their setting values for each of user (step S10). The respective setting values are stored in the setting value memory unit 38. By this new setting of the setting values, existing average values and correction values are cleared (deleted) (step S12) and the control value operation unit 44 calculates initial control values for the low injection speed, the high injection speed and the high speed injection starting position by utilizing these setting values and presets them (step S14).

Next, whether or not correction values are written in the correction value memory unit 42 is determined (step S16). If any correction value is not written therein, a cycle of actual casting is performed with those initial control values (step S20).

If any correction values are written in the correction value memory unit 42, the control value operation unit 44 corrects and calculates the control values and sets the corrected control values (step S18). Then, a cycle of actual casting is performed with the corrected control values (step S20).

In a cycle of actual casting, plunger position data is fetched by the position sensor 14 at real time and a travel speed (actual value) of the injection plunger 12 is calculated from changes in plunger position by means of the speed operation unit 32 and a high speed injection starting position (actual value) is detected by the high speed injection starting position detecting unit 34 (step S22).

Whether or not the actual values obtained in the above manner are within each predetermined control range is determined (step S24). If the actual values are not within the control range, it is determined that an error has occurred and an alarm treatment such as output of an alarm message is performed without using the actual values for calculation of average values (step S26).

If the actual values are within the control range, average values are calculated by the average value operation unit 36 with the actual values as new sampling data (step S28). There is a maximum value in sampling number for the calculation of this average value. If a sampling number exceeds the maximum value, data older in time series are not used for calculation of the average value and then deleted.

Next, whether or not a difference between the average value and the setting value is within allowable values is determined (step S30). If the difference between the average value and the setting value is within the allowable values, calculation for correction is not performed and the processing returns to step S16, thereby maintaining current condition.

If the difference between the average value and the setting value is not within the allowable values, the correction value operation unit 40 compares a setting value written in the setting value memory unit 36 with the average value and calculates correction values for respective setting values so as to eliminate that difference and then stores it in the correction value memory unit 42 (step S32). Then the processing returns to step S16.

Accordingly, if the difference between the average value and the setting value is not within the allowable values, control values for the low injection speed, the high injection speed and the high speed injection starting position for next actual casting are intelligently corrected by feed-forward fashion, actual low injection speed, high injection speed and high speed injection starting position are always fit to the respective setting values regardless of such a disturbance as changes in oil temperature and a delay in operation of the hydraulic system.

In the above description, the present invention has been described with respect to its particular embodiments in details. However, it is apparent to those skilled in the art that the present invention is not restricted to these embodiments but various modifications may be formed within a sprit and scope of the present invention.

As understood according to the above description, in the embodiment of the control method for the die cast machine of the present invention, actual average values of injection speed, speed change-over plunger position and the like in actual casting are obtained and these average values are compared with each of setting values. Then, control values for injection speed and change-over plunger position for next actual casting are corrected by feed-forward fashion so as to eliminate a difference between the average values and the setting values. Consequently, an appropriate multi-step injection speed control following an appropriate value is automatically performed without depending on operators.

If the actual values are not within the control range, the actual values are not used for calculation of average values and excluded from an objective for sampling for intelligent control. Thus, even if an error occurs in actual casting, it is possible to perform optimum intelligent control.

Further, according to the above embodiment, just after the setting values are newly set, average values are obtained according to only actual values provided by a frequency of actual castings after that newly setting and control values for the injection speed and the speed change-over plunger position for next actual casting are corrected so as to eliminate a difference between the setting values and the average values. Thus, intelligent control is performed just after the setting values are newly set and an appropriate multi-step injection speed control based on appropriate values are performed just after the setting values are newly set.

What is claimed is:

1. A control method for die cast machines, which performs multi-step injection speed control depending on a plunger position of an injection cylinder apparatus, said control method comprising the steps of:

storing setting values of injection speeds of respective speed steps and speed change-over plunger positions preliminarily in memories;

measuring actual values for the injection speed and speed change-over plunger positions in actual casting;

obtaining average values of the actual values in actual castings of a predetermined frequency; and correcting control values for the injection speed and the speed change-over plunger position in next casting to be performed so as to eliminate a difference between said setting values and said average values.

2. A control method for die cast machines as claimed in claim 1 wherein whether or not said actual values are within each of predetermined control ranges and if said actual values are not within each of the control ranges, it is determined that an error occurs so that said actual values are not utilized for calculation of said average values.

3. A control method for die cast machines as claimed in claim 1 wherein said average values are cleared each time when said setting values are newly set and if a frequency of actual castings does not reach said predetermined frequency just after said setting values are newly set, said average values are obtained according to the actual values of a frequency of actual castings just after said newly setting and further the control values for the injection speed and the speed change-over plunger position for next actual casting are corrected so as to eliminate a difference between said setting values and said average values.

4. A control method for die cast machines as claimed in claim 2 wherein said average values are cleared each time when said setting values are newly set and if a frequency of actual castings does not reach said predetermined frequency just after said setting values are newly set, said average values are obtained according to the actual values of a frequency of actual castings just after said newly setting and further the control values for the injection speed and the speed change-over plunger position for next actual casting are corrected so as to eliminate a difference between said setting values and said average values.

* * * * *